Patented May 27, 1924.

1,495,498

UNITED STATES PATENT OFFICE.

FRANZ A. RODY, OF NEWARK, NEW JERSEY, ASSIGNOR TO METALLURGICAL COMPANY OF AMERICA, OF NEW YORK, N. Y., A CORPORATION OF NEW JERSEY.

TREATMENT OF FELDSPAR, LEUCITE, AND THE LIKE.

No Drawing. Application filed May 18, 1915, Serial No. 28,891. Renewed January 24, 1918. Serial No. 213,612.

*To all whom it may concern:*

Be it known that I, FRANZ A. RODY, a subject of the Emperor of Germany, residing at Newark, county of Essex, State of New Jersey, have invented certain new and useful Improvements in the Treatment of Feldspar, Leucite, and the like; and I do hereby declare the following to be a full, clear, and exact description of the invention, such as will enable others skilled in the art to which it appertains to make and use the same.

In Letters Patent of the United States No. 1,151,533 granted to me under date of August 24, 1915, I have described a method for the extraction of alkalies and alumina from silicates containing them (such as feldspar, leucite, etc.) by bringing to a sintering temperature a mixture containing the silicate together with an alkaline earth metal oxide or its equivalent in proportion to form an orthosilicate of the alkaline earth metal and at the same time combining the alkali and alumina in water-soluble form as alkali metal aluminate.

I have further discovered that, to some extent at least, the iron present in the native silicate forms a ferrate or some other compound with the alkali in preference to combining with the alumina and that, upon the addition of water, this compound of iron breaks up, freeing the alkali, which goes into solution and increases the ratio found in the water-soluble product. Accordingly, in another co-pending application I have taken into consideration the effect of the combined iron and, after deducting the amount of silica required to unite with the iron present to form a metasilicate of iron of bisilicate degree, I add just sufficient alkaline earth metal oxide or its equivalent so that for the remaining silica there are two molecules of the said oxide for each molecule of silica. When this mixture is treated in accordance with the procedure set forth in my Patent No. 1,151,533, I obtain a water-soluble product, when the clinker is boiled in water, that has a lower ratio between the alumina and alkali, such ratio varying according to the conditions under which the sintering takes place, but averaging about 1:1.5. In this manner, the same yield in alumina is obtained and at the same time a less amount of alkali and alkaline earth metal oxide or its equivalent is required.

In carrying into practice the present invention, I make a mixture of alkali metal aluminum silicate (represented by the feldspar, leucite, or like naturally occurring silicate rock) alkali metal carbonate or hydroxide (wet or dry) with alkaline earth metal oxide or its equivalent in the following proportions:

$Al_2O_3$ : alkali as $K_2O$ : : 1 : 1.5

Net $SiO_2$ : alkaline earth metal oxide as $CaO$ : : 1 : 2.0.

By "net $SiO_2$," is meant the silica remaining after that silica calculated as $FeO\ SiO_2$ with the iron in the mixture is deducted from the total silica in the mixture. The mixture is heated to a clinkering heat, whereupon orthosilicate of lime, metasilicate of iron of bisilicate degree, and alkali metal aluminate are supposedly formed. The clinker obtained is crushed, boiled with water, and the soluble part consisting of alkali metal aluminate, separated by filtration. The filtrate is treated by any of the well-known ways for obtaining the alumina and the alkalies.

In order to more clearly illustrate the practice of the invention, I may give the following example as typical of the mixture, using limestone as a source of alkaline earth metal oxide.

*Composition of materials.*

| | Silicate rock. | Potassium carbonate. | Limestone. |
|---|---|---|---|
| $SiO_2$ | 52% | | 1% |
| $MgO+CaO$ as $CaO$ | 8% | | 54% |
| $FeO$ | 4% | | |
| $Al_2O_3$ | 14% | | |
| $K_2O+Na_2O$ as $K_2O$ | 12% | 68.0% | |

4% $FeO$ = 3.3% $SiO_2$ as $FeO.SiO_2$
8% $CaO$ = 4.3% $SiO_2$ as $2CaO.SiO_2$ 7.6% $SiO_2$

SiO$_2$. 52% − 7.6% = 44.4% SiO$_2$ to be fluxed = 83% CaO as 2CaO.SiO$_2$ 1% SiO$_2$ = 1.9% CaO as 2CaO.SiO$_2$ CaO. 54% − 1.9% = 52.1% CaO available for fluxing.

$$\frac{83.0 \times 100}{52.1} = 159 \text{ parts of limestone per 100 parts of silicate rock.}$$

Al$_2$O$_3$.14% = 19.3% K$_2$O as 1.5 K$_2$O.Al$_2$O$_3$
12.0% K$_2$O present in the rock
7.3% K$_2$O to be added.

$$\frac{7.3 \times 100}{68.0} = 10.7 \text{ parts of K}_2\text{CO}_3 \text{ per 100 parts of silicate rock.}$$

The charge is therefore made up in the following proportions:

|  | Parts. |
|---|---|
| Alkali alumina silicate | 100 |
| Potassium carbonate | 10.7 |
| Limestone | 159 |

It will be understood that I do not limit myself to the exact ratio Al$_2$O$_3$ : K$_2$O : : 1 : 1.5 but that I can vary the ratio more or less within approximate limits. The ratio represents, however, the general average which I have obtained in the course of my work.

The mixture is sintered, cooled and ground to a fine powder, as set forth in my Patent No. 1,151,533 to permit a rapid and complete extraction of the alkali aluminate by boiling in water. The solution is then filtered and the alumina precipitated out by any suitable means, as, for example, by passing carbon dioxide through the clearer liquid. After the hydrate of alumina is filtered off, the solution consists substantially of sodium potassium salts. It is found that the relative proportion of these is practically the same as that contained in the original silicate.

What I claim is:

1. The method of recovering alkalies and alumina from feldspar, leucite and like naturally occurring silicate rock containing them, which comprises raising to a sintering temperature, in one operation, a mixture containing such silicate rock, an alkali, and an oxide of an alkali-earth metal, in such proportions that the alkali and alumina will be freed in water-soluble form with the production of an insoluble ortho-silicate of an alkali-earth metal; substantially as described.

2. The method of recovering alkalies and alumina from feldspar, leucite and like naturally occurring silicate rock containing them, which comprises, in one operation, raising to a sintering temperature a mixture in which there is 1 molecule of alumina for every 1.5 molecules of alkali, and 2 molecules of an alkali-earth metal for every 1 molecule of silica left after deducting the amount of silica required to furnish 1 molecule of silica for every 1 molecule of iron present to form a metasilicate of iron of bisilicate degree, thereby freeing all the alkalies and alumina in water-soluble form; substantially as described.

In testimony whereof I affix my signature, in presence of two witnesses.

FRANZ A. RODY.

Witnesses:
H. M. BURKEY,
JEROME S. KATZ.